(12) United States Patent
Colvin

(10) Patent No.: US 10,054,333 B1
(45) Date of Patent: Aug. 21, 2018

(54) OUTDOOR EQUIPMENT SUPPORT PLATFORM

(71) Applicant: Lee Colvin, Odessa, FL (US)

(72) Inventor: Lee Colvin, Odessa, FL (US)

( * ) Notice: Subject to any disclaimer, the term of this patent is extended or adjusted under 35 U.S.C. 154(b) by 0 days.

(21) Appl. No.: 15/595,132

(22) Filed: May 15, 2017

(51) Int. Cl.
| | | |
|---|---|---|
| *F24F 13/32* | (2006.01) | |
| *F24F 1/60* | (2011.01) | |
| *E02D 27/44* | (2006.01) | |
| *F16M 7/00* | (2006.01) | |
| *F16M 9/00* | (2006.01) | |

(52) U.S. Cl.
CPC .............. *F24F 13/32* (2013.01); *E02D 27/44* (2013.01); *F24F 1/60* (2013.01); *F16M 7/00* (2013.01); *F16M 9/00* (2013.01)

(58) Field of Classification Search
CPC .. F24F 13/30; F24F 13/32; F24F 1/60; F16M 7/00; F16M 9/00; F16M 5/00; F16M 11/00; F16M 11/20; F16M 11/30; E02D 27/44; E02D 27/50; B65D 19/0036; B65D 2519/0096; B65D 2519/00069; B65D 2519/00268; B65D 2519/00288; B65D 2519/00298; B65D 2519/00318; B65D 2519/00333; B65D 2519/00338; B65D 2519/00407; B65D 2519/00412; B65D 2519/00781; B65D 2519/00791; B65D 2519/00796; B65D 2519/00805; B65D 2519/00034
USPC ....... 248/678, 679, 680, 237, 146, 158, 688, 248/677, 500, 346.01, 346.02, 346.03, 248/188.2, 649; 108/55.5, 57.2, 53.3, 108/57.25, 57.28; 206/599
See application file for complete search history.

(56) References Cited

U.S. PATENT DOCUMENTS

| | | | | |
|---|---|---|---|---|
| 3,713,620 | A | * | 1/1973 | Tkach ...................... F16M 7/00 188/268 |
| 3,722,845 | A | | 3/1973 | Unger |
| 4,243,197 | A | * | 1/1981 | Wright .................. D06F 39/081 220/DIG. 6 |
| 4,592,532 | A | * | 6/1986 | Stith, Jr. .................. E02D 27/44 248/188.2 |
| 4,817,794 | A | * | 4/1989 | Workman ............... E04G 25/00 206/372 |
| 4,830,320 | A | * | 5/1989 | Bellows .................. A47B 91/12 248/188.2 |
| 5,076,534 | A | * | 12/1991 | Adam ...................... F16M 5/00 248/678 |
| 5,961,093 | A | | 10/1999 | Jones et al. |
| 6,155,004 | A | * | 12/2000 | Earhart ............... E04F 13/0853 52/217 |
| 7,334,421 | B1 | | 2/2008 | Cantolino |
| 7,344,334 | B2 | | 3/2008 | Thorkelson |

(Continued)

*Primary Examiner* — Nkeisha Smith
(74) *Attorney, Agent, or Firm* — Global Intellectual Property Agency, LLC; Daniel Boudwin

(57) ABSTRACT

An outdoor equipment support platform. The outdoor support platform includes an upper side that can support outdoor equipment thereon, such as an air conditioning unit. A plurality of channels are disposed on the upper side of the support platform that guide liquid away from the upper side of the platform to a support surface. The plurality of channels define a plurality of unrecessed portions. At least four of the plurality of unrecessed portions are located at a perimeter of the platform. At least one aperture is disposed on the upper side to receive a fastener therethrough.

9 Claims, 3 Drawing Sheets

(56) References Cited

U.S. PATENT DOCUMENTS

| | | | |
|---|---|---|---|
| D600,875 S * | 9/2009 | Hermans | F16M 5/00 D34/38 |
| 7,607,628 B2 * | 10/2009 | Elder | B65D 19/0036 108/53.3 |
| 7,780,140 B1 | 8/2010 | Ward et al. | |
| 7,891,635 B2 * | 2/2011 | Rowland | F16M 5/00 220/571 |
| 2003/0183741 A1 | 10/2003 | Milner | |
| 2004/0211878 A1 * | 10/2004 | Orozco | E02D 5/80 248/679 |
| 2005/0263043 A1 * | 12/2005 | Proudlove | B65D 19/0018 108/56.3 |
| 2010/0320360 A1 * | 12/2010 | McLeod | F16M 5/00 248/678 |
| 2015/0152996 A1 * | 6/2015 | Spratt | F16M 5/00 248/678 |

* cited by examiner

OUTDOOR EQUIPMENT SUPPORT PLATFORM

BACKGROUND OF THE INVENTION

The present invention relates to support platforms. Specifically, the present invention provides a support platform for outdoor equipment that prevents water accumulation damage to outdoor equipment.

Many people have outdoor equipment, such as an air conditioning unit tied into their homes. During heavy rainfall, flooding, and hurricanes, such outdoor equipment can suffer severe damages due to the accumulation of water therearound. Additionally, heavy wind can cause the equipment to fall causing more damage. Therefore, an outdoor equipment support platform providing drainage and securing means is provided.

In light of the devices disclosed in the known art, it is submitted that the present invention substantially diverges in design elements from the known art and consequently it is clear that there is a need in the art for an improvement to existing support platforms. In this regard, the instant invention substantially fulfills these needs.

SUMMARY OF THE INVENTION

In view of the foregoing disadvantages inherent in the known types of support platforms now present in the prior art, the present invention provides a support platform wherein the same can be utilized for providing convenience for the user when preventing water accumulation damage to outdoor equipment.

The present system comprises a platform having an upper side configured to support outdoor equipment thereon. A plurality of channels is disposed on the upper side. At least one aperture is disposed on the upper side adapted to fit a fastener therethrough. In some embodiments, the platform further comprises a recess disposed on a lower side of the platform. In other embodiments, the recess comprises the same cross section as the platform. In another embodiment, the plurality of channels extend along at least one sidewall of the platform. In yet another embodiment, the plurality of channels extend along the lower side. In some embodiments, at least one aperture is disposed along a perimeter of the platform. In another embodiment, the platform is water resistant. In other embodiments, the plurality of channels intersect perpendicularly along the upper side. In yet other embodiments, the plurality of channels comprise horizontal and vertical channels relative to the plane of the upper side.

BRIEF DESCRIPTION OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
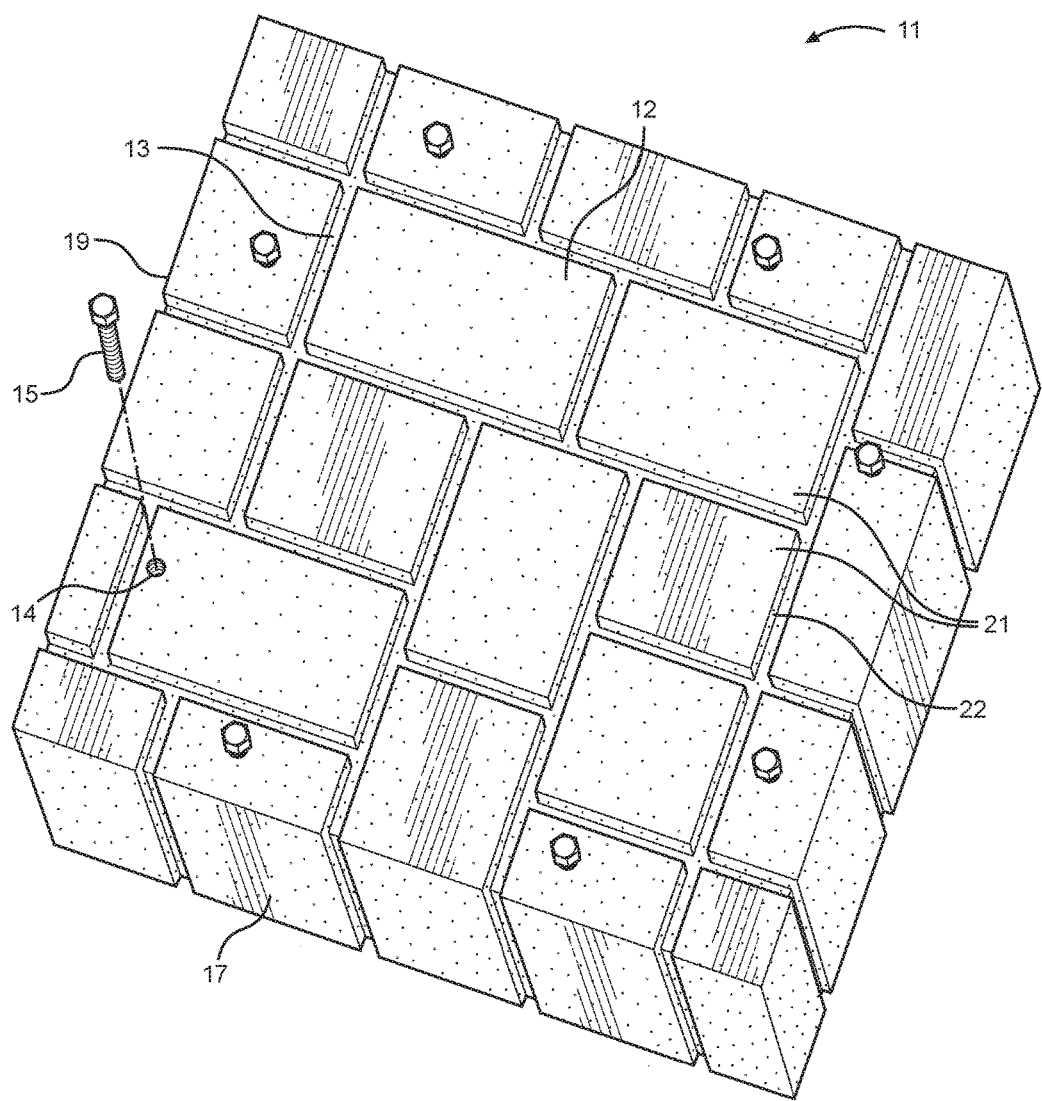
FIG. 1 shows a perspective view of an embodiment of the outdoor equipment support platform.

Reference is made herein to the attached drawings. Like reference numerals are used throughout the drawings to depict like or similar elements of the support platform. The figures are intended for representative purposes only and should not be considered to be limiting in any respect.

Referring now to FIG. 1, there is shown a perspective view of an embodiment of the outdoor equipment support platform. The platform 11 comprises an upper side 12 having a plurality of channels 13 thereon. The platform 11 is configured to support outdoor equipment thereon, such as an air conditioning unit. In the illustrated embodiment, the platform 11 comprises a square cross section, however, in alternate embodiments, the platform 11 can comprise any suitable cross section configured to receive outdoor equipment thereon, including but not limited to circular and rectangular. The platform 11 is configured to rest on a support surface. In some embodiments, the platform 11 comprises a water-resistant material or coating allowing the liquid being channeled to easily flow away from the upper side 12. The platform 11 comprises a suitable durable material capable of withstanding the wear and tear associated with being outdoors, including but not limited to cement or plastic.

The plurality of channels 13 are configured to guide liquid away from the upper side 12 towards a support surface. In the illustrated embodiment, the plurality of channels 13 comprise horizontal and vertical lines relative to the plane of the upper side 12 which intersect each other perpendicularly along the upper side 12. This configuration of the plurality of channels 13 provides an increased operable surface area to the plurality of channels 13, allowing liquid to be guided away from the upper side 12 to a support surface at a quicker rate. Additionally, this pattern provides an aesthetically pleasing appearance mimicking that of paver stones.

A plurality of unrecessed portions 21 of the upper side 12 are defined by the plurality of channels 13. In the illustrated embodiment, five of the plurality of unrecessed portions 21 are disposed along a perimeter 19 of the platform 11. Additionally, seven of the plurality of unrecessed portions 21 are defined by a channel of the plurality of channels 13 disposed along each side 22 of the plurality of unrecessed portions 21. In other embodiments, the plurality of channels 13 comprise other patterns, including but not limited to all horizontal, all vertical, diagonal, curved, and the like. In some embodiments, the plurality of channels 13 continue along at least one sidewall 17. This provides the liquid being channeled a path to the support surface.

At least one aperture 14 is disposed on the upper side of the platform 11. The aperture 14 continues through the platform 11 and is adapted to fit a fastener 15 therein. The fastener 15 is configured to secure the outdoor equipment to the platform 11. This reduces the risk of the outdoor equipment tipping over in high wind conditions. The fastener 15 comprises any suitable fastening device, including but not limited to a screw or a bolt. In some embodiments, the fastener 15 further comprises an eyelet configured to receive a tie-down strap or wire cord for securement purposes. In the illustrated embodiment, the aperture 14 is disposed along the perimeter 19 of the platform 11. This configuration allows a space for the outdoor equipment to rest in the center of the platform 11.

Figure 2:
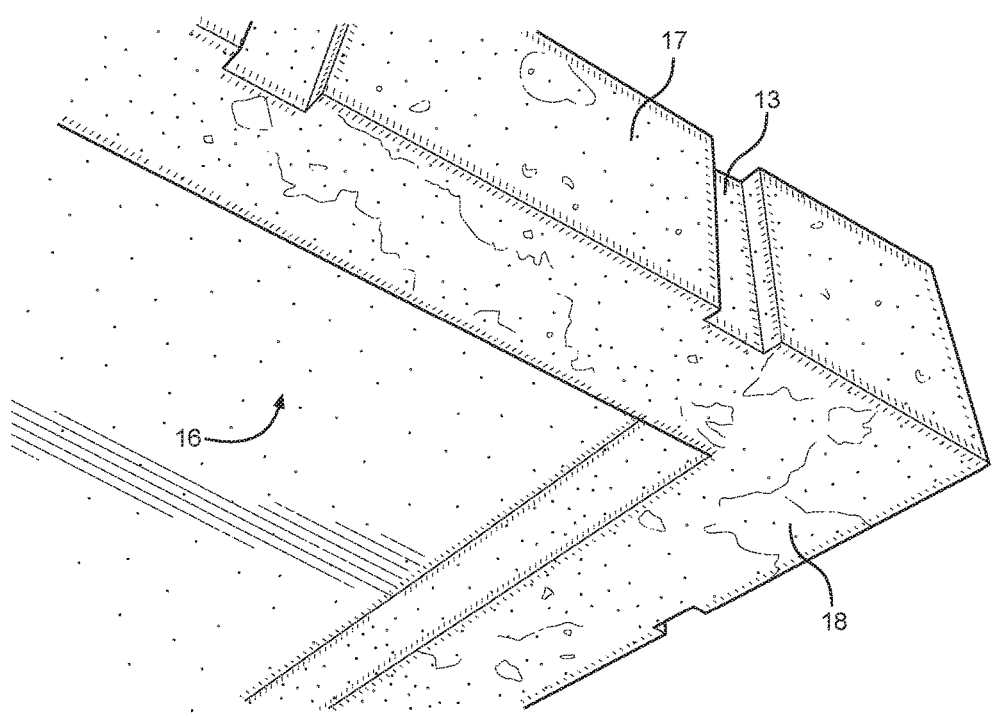
FIG. 2 shows a close-up view of the lower side of an embodiment of the outdoor equipment support platform.

Referring now to FIG. 2, there is shown a close-up view of an embodiment of the lower side of the outdoor equipment support platform. In the illustrated embodiment, a recess 16 is disposed on a lower side 18 of the platform 11. The recess 16 allows the platform 11 to be level in areas where uneven ground exists. The recess 16 receives a ground protrusion therein, such that the platform may rest flush with the ground. In the illustrated embodiment, the recess 16 comprises the same cross section as the platform 11, however, in alternate embodiments, the cross section of the recess 16 can be any suitable shape, including but not limited to circular. In the illustrated embodiment, the plurality of channels 13 extend along the sidewall 17 of the platform.

Figure 3:
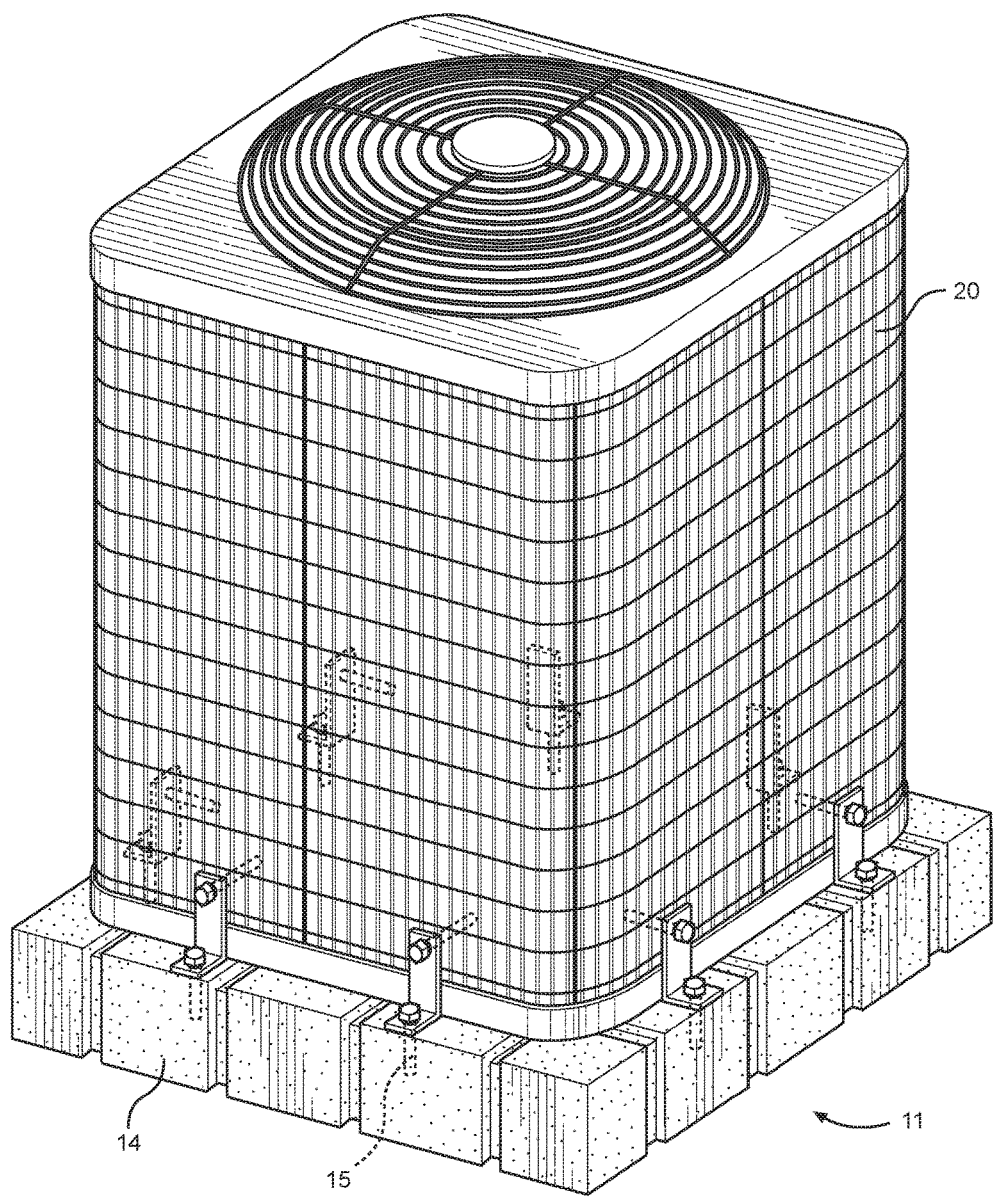
FIG. 3 shows a perspective view of an embodiment of the outdoor equipment support platform supporting an air conditioner.

Referring now to FIG. 3, there is shown a perspective view of an embodiment of the outdoor equipment support platform supporting an air conditioner. In the illustrated embodiment, the air conditioning unit 20 is supported on the platform 11 and is removably securable to the platform 11 via the fasteners 15 within apertures 14. In the illustrated embodiment, the fasteners directly secure the air conditioning unit 20, however in alternate embodiments, the air conditioning unit 20 is disposed within the fasteners 15, such that the air conditioning unit 20 can be secured to the fasteners 15 using tie-down straps or wire cord. In the illustrated embodiment, the air conditioning unit 20 is removably secured to the platform 11 using L-shaped brackets or wire straps fastened to the platform 11 and the air conditioning unit 20. Removably securing the air conditioning unit 20 to the platform 11 provides stability preventing the air conditioning unit 20 from falling during a heavy wind or other volatile weather conditions.

In one use, the user places the platform 11 on a cleared and level support surface in a desired location for the air conditioning unit 20. Should the support surface be uneven, the user places any protruding sections of the support surface within the recess 16 such that the platform can rest flush with the support surface. The air conditioning unit 20 is then placed on top of the platform 11 such that it rests on the upper surface 12. The air conditioning unit 20 is removably secured to the platform 11 via the fasteners 15. During inclement weather, the plurality of channels 13 are adapted to guide the rainwater away from the base of the air conditioning unit 20. The channels allow the rainwater to continue along the pathway of the plurality of channels until it reaches the sidewall 17, at which point gravity guides the rainwater towards the ground away from the air conditioning unit 20. In some embodiments, the rainwater is further guided via the plurality of channels 13 along the sidewall 17. During high winds, the air conditioning unit 20 would resist tipping as it is removably secured to the platform 11, providing stability.

It is therefore submitted that the instant invention has been shown and described in various embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An outdoor equipment support platform, comprising:
    a platform having an upper side configured to support outdoor equipment thereon;
    a plurality of channels disposed on the upper side;
    wherein the plurality of channels extend along an entire sidewall of the platform from an outermost edge of the upper side to an outermost edge of a lower side of the platform;
    a plurality of unrecessed portions disposed on the upper side are defined by the plurality of channels;
    wherein at least four of the plurality of unrecessed portions are disposed along a perimeter of the platform;
    at least one aperture disposed on the upper side adapted to receive a fastener therethrough.

2. The outdoor equipment support platform of claim 1, wherein the platform further comprises a recess disposed on the lower side.

3. The outdoor equipment support platform of claim 2, wherein the recess comprises a same cross section as the platform.

4. The outdoor equipment support platform of claim 1, wherein at least one aperture is disposed along a perimeter of the platform.

5. The outdoor equipment support platform of claim 1, wherein the platform is water resistant.

6. The outdoor equipment support platform of claim 1, wherein the plurality of channels intersect perpendicularly along the upper side.

7. The outdoor equipment support platform of claim 1, wherein the plurality of channels comprise horizontal and vertical channels parallel to a plane of the upper side.

8. The outdoor equipment support platform of claim 1, wherein at least one unrecessed portion of the plurality of unrecessed portions are defined by a channel of the plurality of channels disposed on each side of the unrecessed portions.

9. The outdoor equipment support platform of claim 1, wherein the plurality of channels and the plurality of unrecessed portions form an asymmetrical upper surface.

* * * * *